INVENTOR.
EDWARD D. ABRAHAM
BY
Oberlin & Limbach
ATTORNEYS

May 14, 1963 E. D. ABRAHAM 3,089,206
BLOW AND SQUEEZE MOLDING MACHINE AND METHOD OF MOLDING
Filed Jan. 13, 1958 3 Sheets-Sheet 3

*INVENTOR.*
EDWARD D. ABRAHAM
*BY*
Oberlin & Limbach
ATTORNEYS 3,089,206
Patented May 14, 1963

3,089,206
BLOW AND SQUEEZE MOLDING MACHINE AND METHOD OF MOLDING
Edward D. Abraham, Cleveland, Ohio, assignor to The Osborn Manufacturing Company, Cleveland, Ohio, a corporation of Ohio
Filed Jan. 13, 1958, Ser. No. 708,446
14 Claims. (Cl. 22—36)

This invention relates as indicated to a blow and squeeze molding machine and method of molding, and more particularly to an improved machine and process whereby foundry molding sand may be blown into a box or flask against an appropriate pattern and then subjected to a subsequent squeezing operation at the same station.

Reference may be had to application Serial No. 520,714, of Leon F. Miller, "Foundry Molding Process," filed July 8, 1955, now Patent 2,866,242, issued Dec. 30, 1958, and to an application Serial No. 672,640, of Leon F. Miller and Edmond K. Hatch, "Blow and Squeeze Molding Machine," filed July 18, 1957, now Patent 2,908,950, issued Oct. 20, 1959, for disclosures of methods and procedures generally related to that of the present invention. It is an object of the present invention to provide a blow and squeeze molding machine adapted for use in conjunction with a flask transporting turntable of the general type disclosed in U.S. Patent 2,783,509 to L. F. Miller, for example.

Another object is to provide a method of forming molds in foundry flasks by means of a blowing operation with provision of venting means elsewhere than in the flasks themselves.

Still another object is to provide an improved machine designed to ensure complete nad uniform filling of the flask by the blowing operation.

A further object is to provide squeeze means effective at the blow station further to compact the sand in the flask in the regions most requiring such action.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
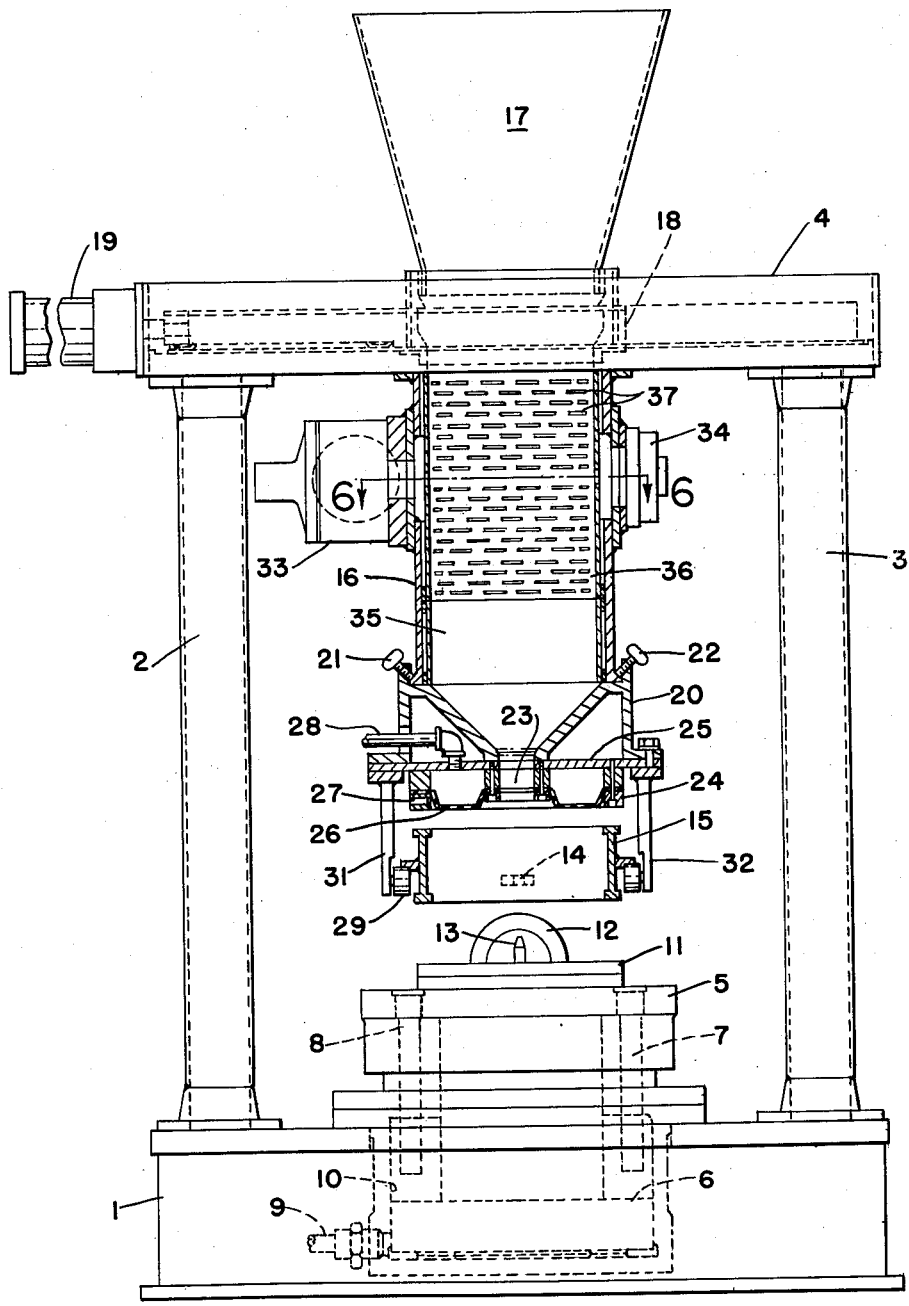
FIG. 1 is a side elevation of a machine embodying the principles of my invention, with certain portions shown in cross-section better to disclose the internal arrangement thereof.

Referring now more particularly to such drawing and especially FIG. 1 thereof, any standard form of core blowing machine may be utilized in the practice of my new invention such as, for example, the machine shown and described in Patent No. 2,545,944 to R. W. Ellms, but I show and describe below a somewhat modified and improved form of machine which I prefer to employ for this purpose. The illustrative embodiment shown in FIG. 1 comprises a main base frame 1 supporting vertical columns such as 2 and 3 which in turn carry a head frame 4. On such base is mounted a vertical lift table 5 of the usual type carried by piston 6 and provided with vertical guides 7 and 8. Air under pressure may be admitted through inlet 9 to the lower end of cylinder 10 to elevate piston 6 and with it table 5. Upon such table 5 is mounted a pattern board 11 with a pattern 12 thereon and the usual tapered guide pins such as 13 adapted to engage in corresponding pin lugs such as 14 on flask 15.

A vertical cylindrical sand reservoir 16 depends from head frame 4 and is adapted to be filled with sand through a fill chute 17 from an appropriate overhead hopper (not shown). A slide gate 18 is adapted to be reciprocated horizontally by means of pneumatic piston-cylinder assembly 19 in order to close off the upper end of reservoir 16, an appropriate seal being provided such as an inflatable rubber ring.

A funnel bottom 20 is detachably mounted to the lower end of cylindrical sand reservoir 16 by means of screws such as 21 and 22, leading to blow opening 23 in adapter 24. Such adapter defines with bottom plate 25 an annular downwardly opening channel which is, however, closed on its underside by means of flexible diaphragm 26, ordinarily of rubber. A plurality of air vents such as 27 are provided in the outer side wall of adapter 24 below the point where such annular diaphragm is secured. An air line 28 leads to the annular cavity above such diaphragm for admission of air pressure thereto when desired. Hydraulic fluid (e.g., oil or water) may be introduced to such cavity instead of air and this may be preferred as affording an increased safety factor. It is not ordinarily necessary to employ very high pressures for this purpose, about 60 pounds per square inch usually being adequate. Likewise, it is not ordinarily necessary to employ very high pressure air in the blow, since this operation is closely followed by the squeezing operation, with a consequent saving in cost and wear.

The flask 15 may be supported by its lateral flanges on rollers such as 29 and 30 carried by depending hangers 31 and 32 so that the flask resting thereon is spaced somewhat below adapter 24.

Blow valve 33 mounted on the side of reservoir 16 may be of conventional type. Similarly, exhaust valve 34 may desirably be of the type disclosed and claimed in the aforesaid Ellms patent.

Figure 6:
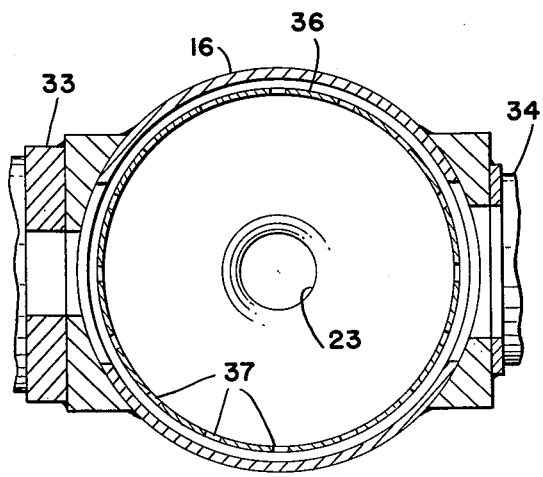
FIG. 6 is a horizontal section taken on the line 6—6 of FIG. 1.
Figure 7:
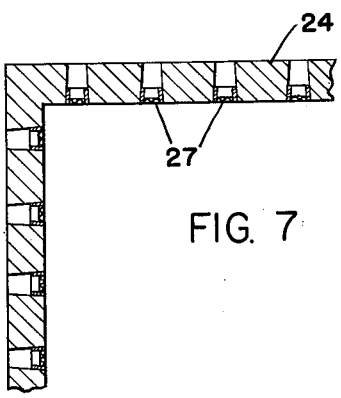
FIG. 7 is a fragmentary horizontal section through the flask venting means taken on the line 7—7 on FIG. 4.

The reservoir 16 is provided with an imperforate lower cylindrical inner sleeve 35 spaced slightly inwardly of the reservoir wall, and an upper longer cylindrical sleeve 36 extends thereabove provided with a large number of narrow horizontal slots 37 for admission of air to the interior of such sleeves from the space between the sleeves and the wall of reservoir 16 (see also FIG. 6).

*Operation*

In the light of the foregoing description, the operation of the machine in carrying out my new molding process may now be understood with particular reference to FIGS. 2–5 of the drawing.

Figure 2:
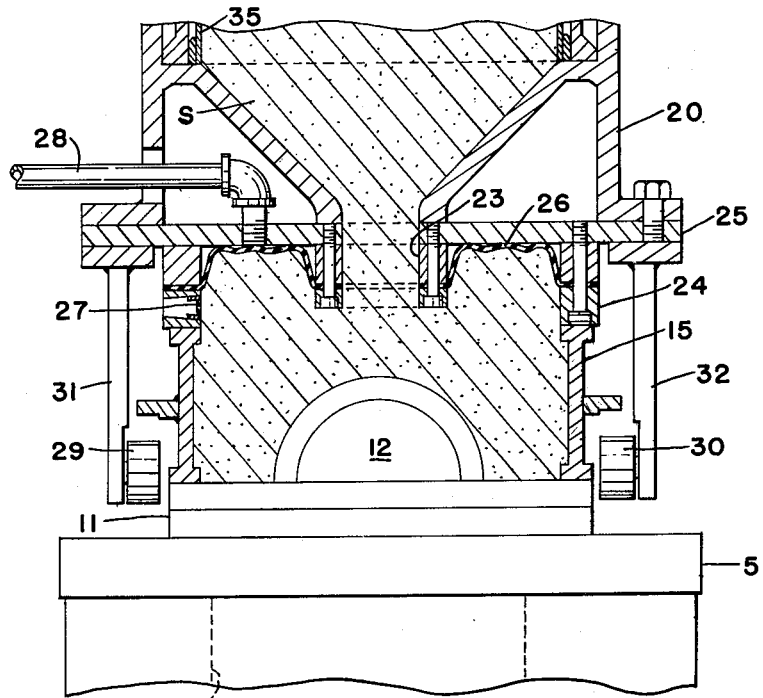
FIG. 2 is an enlarged vertical cross-section of a portion of the machine of FIG. 1 with the parts arranged in the "blow" position.
Figure 3:
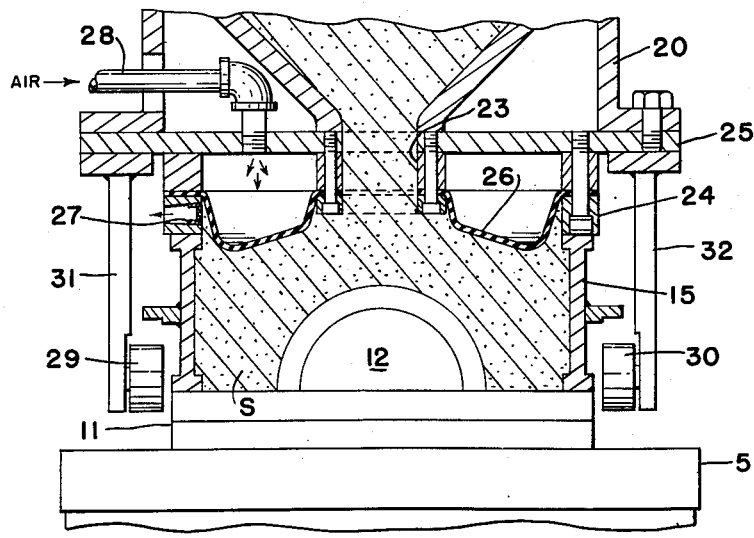
FIGS. 3 and 4 are vertical sections corresponding to FIG. 2 and illustrating successive stages in the operation of the machine.

An empty flask 15 supported on rollers such as 29 and 30 is engaged by pattern board 11 when table 5 is elevated through lifting of clamp cylinder piston 6. As the table continues to rise, the flask is picked up from its roller support and firmly clamped against the underside of adapter 24 as shown in FIG. 2, making a tight seal therewith.

The reservoir has previously been filled with green molding sand and the slide gate 18 reciprocated into position to seal the top opening of the reservoir. When high pressure air is now introduced into the side of the reservoir through blow valve 33, the air passes around through the narrow annular space between the outer wall of such reservoir 16 and the inner cylindrical sleeves 35 and 36

(the vertical extent of imperforate cylindrical sleeve 35 is about one-half of its diameter, whereas the length of slotted sleeve 36 somewhat exceeds its diameter), the air entering through the many narrow slots 37 into the body of sand and forcing the resultant air and sand mixture downwardly through blow opening 23 into the flask. By this operation, the sand S is very firmly compacted against all surfaces of the pattern 12 and the flexible annular diaphragm 26 is bulged upwardly as shown in FIG. 2 to form an annular upset projecting considerably above the upper edge of flask 15. The air escape from the flask and upset through the screen vents 27 which are fitted in corresponding outwardly tapering openings in adapter or upset retainer 24.

The blow is now terminated and air pressure within the reservoir is exhausted through the reservoir exhaust valve 34 in the usual manner. At this stage, high pressure air is introduced through line 28 into the annular space above diaphragm 26 (FIG. 3) to depress such diaphragm and squeeze the sand firmly in the flask. As will be apparent, such squeezing operation is especially effective in the outer peripheral portions of the mold where there will normally be the greatest depth of sand within the flask, the pattern 12 normally occupying a central position with its upper surface directly below the blow opening 23 with the result that the sand in this region will have been very firmly compacted by the blowing operation itself.

Figure 4:
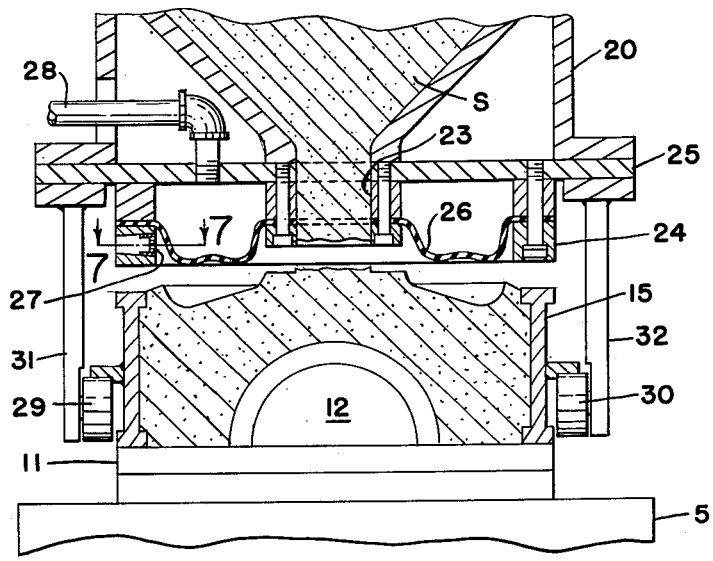
Figure 5:
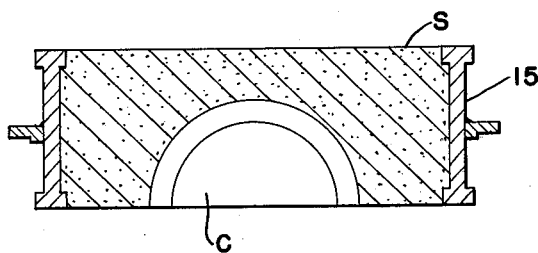
FIG. 5 shows the completed mold.

Upon completion of the squeeze and releasing the air pressure in line 28, the table 5 may now be lowered as indicated in FIG. 4 to unclamp the flask 15 and deposit the same on the rollers such as 29 and 30. The table is then further lowered to draw the pattern 12 from the mold, leaving a corresponding cavity C as shown in FIG. 5. Also as shown in FIG. 5, the upper surface of the mold will ordinarily be smoothed and leveled flush with the corresponding edge of the flask prior to its use on the pouring floor.

The arrangement of internal sleeves 35 and 36 greatly reduces the tendency of sand to be pulled into exhaust valve 34 when the reservoir is exhausted. The provision of the lower imperforate sleeve or liner 35 and the previously indicated dimensional proportions of the two sleeves ensure complete filling of the flask and upset. The slots 37 are horizontal and quite narrow to avoid any substantial passage of sand therethrough. Flexible diaphragm 26 may also be somewhat distensible and elastic, if desired, utilizing rubber, neoprene, or rubberized fabric, for example.

In order efficiently to fill the flask and upset with sand, the ratio of the inner diameter of the reservoir sleeves to the diameter of hole 23 should ordinarily be less than 4 to 1. The location of the vents 27 in the upset retainer below diaphragm 27 removes or reduces the need for providing vents in the flask itself and facilitates filling the annular upset with sand.

The compactness of the sand against the pattern achieved by blow filling makes it possible to get the most out of the diaphragm squeezing operation. The blow is performed through the center of the diaphrgam and the sequence of operations is very rapid and efficient. While a cylindrical flask may conveniently be employed in conjunction with a truly annular diaphragm, it will be understood that various other shapes of flasks or equivalent boxes may be utilized, with the diaphragm generally conforming thereto. Such diaphragm, being operated by fluid pressure, provides an adjustable but uniform squeeze over the area of the mold engaged thereby. The sand upset portion, normally in the form of an annular ridge adjacent the flask sides as shown, is located in a region where there is the greatest need for further compacting, spaced from the generally central region occupied by the pattern. Such upset will preferably project beyond the lip of the flask.

Other modes of applying the principle of the invention may be employed, change being made as regards the details described, provided the features stated in any of the following claims or the equivalent of such be employed.

I, therefore, particularly point out and distinctly claim as my invention:

1. In a mold making machine including a vertical cylindrical sand reservoir having a fill opening at its top, means for closing such opening, a funnel shaped bottom terminating in a central blow hole, and means for clamping a flask or the like in position to receive sand discharged through such hole; a lower imperforate cylindrical sleeve within said reservoir slightly spaced from the inner wall of the latter, an upper cylindrical sleeve extending from the upper end of said lower sleeve to the top of said reservoir and similarly spaced from the wall of the latter, said upper sleeve having a large number of narrow horizontal slots therein, a blow valve adapted to admit air under high pressure into the annular space between said reservoir and said sleeves, an exhaust valve adapted to exhaust air under pressure from such annular space, said lower imperforate sleeve having a length approximately one-half its diameter and said upper slotted sleeve having a length somewhat exceeding its diameter, the ratio of the inner diameter of said sleeves to the diameter of such central blow hole being the ratio of a number less than 4 to 1, a downwardly opening annular channel encircling such blow hole and having an outer circumferential portion adapted to contact the side edge of such flask in sealing engagement, a flexible diaphragm extending across said channel and adapted to be bulged alternately upwardly and downwardly in response to fluid pressure thereagainst, being thus bulged upwardly during the operation of blowing sand from said reservoir into said flask to form an annular sand upset projecting into said channel, and fluid pressure inlet means to said channel above said diaphragm by which fluid pressure may be admitted after termination of the blow and exhausting of said reservoir forcibly to depress and downwardly bulge said diaphragm to squeeze the sand in said flask in such annular region adjacent the sides of said flask prior to unclamping the latter.

2. A mold blowing machine having a vertical cylindrical sand reservoir with a funnel shaped bottom and central blow hole, an inner liner for said reservoir slightly spaced from the inner wall of the latter, the upper portion of said liner having a large number of small apertures therethrough and the lower portion being imperforate throughout a substantial vertical extent, a blow valve operative to admit high pressure air to such space between said liner and the wall of said reservoir, an exhaust valve operative to exhaust air pressure from such space, said reservoir having an upper fill opening for introducing sand thereto, means for closing such latter opening, and means for clamping a flask or the like in position to receive sand discharged through such blow hole, the vertical extent of such lower imperforate portion of said sleeve being approximately one-half its diameter, the vertical extent of the apertured portion of said sleeve somewhat exceeding its diameter, and the ratio of the inner diameter of said sleeve to the diameter of such blow hole being the ratio of a number less than 4 to 1.

3. The machine of claim 2, provided with squeeze means encircling such blow hole operative to squeeze the sand in such flask after the blowing operation and prior to unclamping such flask.

4. In a mold blowing machine having a sand reservoir with an opening for charging with sand, means for closing such opening, a blow valve operative to admit high pressure air to said reservoir, an exhaust valve operative to relieve the pressure in said reservoir, a central blow hole through which sand is discharged from said reservoir by such high pressure air, and clamp means operative to hold a flask or the like firmly in position beneath said blow hole to receive sand discharged through such blow hole; fluid pressure diaphragm squeeze means laterally adjacent and encircling such blow hole operative to squeeze the sand in such flask after the blowing operation and prior to unclamping such flask.

5. In a mold blowing machine having a sand reservoir with an opening for charging with sand, means for closing such opening, a blow valve operative to admit high pressure air to said reservoir, an exhaust valve operative to relieve the pressure in said reservoir, a blow hole through which sand is discharged from said reservoir by such high pressure air, and clamp means operative to hold a flask or the like firmly in position to receive sand discharged through such blow hole; said machine having an annular recess encircling such blow hole toward such flask adapted also to receive sand when such flask is filled by such blowing operation and thereby to form an annular upset, and a fluid pressure diaphragm in such recess operative to squeeze the sand in such upset into such flask further to compact the mold in the latter.

6. The machine of claim 5, including vent openings in the outer side of such recess for escape of air from such flask during such blowing operation.

7. The machine of claim 5, in which said diaphragm is of general U-shape transverse cross-section to facilitate bulging first in one direction and then in the other.

8. In a mold blowing machine having a sand reservoir with an opening for charging with sand, means for closing such opening, a blow valve operative to admit high pressure air to said reservoir, an exhaust valve operative to relieve the pressure in said reservoir, a blow hole through which sand is discharged from said reservoir by such high pressure air, and means operative to hold a flask or the like firmly in sand sealing position to receive sand discharged through such blow hole; a flexible fluid-backed diaphragm encircling such blow hole adapted to bear against the surface of the sand in such flask for squeezing pressure thereagainst prior to unclamping such flask.

9. A molding machine comprising a head, said head having a cavity therein, an opening in said head, flexible means in said cavity in said head adapted to receive fluid to compress sand in a flask adapted to be disposed below said head, a flask support below said head, a pattern plate on said flask support, said opening in said head being relatively small compared to the area of said pattern plate, said opening being centrally disposed in said head, said opening being disposed to project sand in a downward direction into said flask, said flask being adapted to form a seal with said head, said flask support having means on said machine to move said flask toward said head into sealing engagement therewith, means to blow sand through said opening into said flask, the portion of said head defining said opening being disposed adjacent the top level of said flask, and means to move said pattern plate and said flexible means relative to each other after said sand is blown into said flask whereby said sand is compressed between said flexible means and said pattern plate.

10. A molding machine comprising a head, said head having a cavity therein, an opening in said head, a flexible diaphragm overlying said cavity, means in said head to receive fluid under pressure to compress said diaphragm into molding engagement with sand in a flask adapted to be supported below said head, a flask support below said head, a pattern plate on said flask support, said flask having outwardly directed flanges along two upper edges, horizontally spaced wheels engaging said flanges to carry said flask under said cavity and out from under said cavity in said head, said opening in said head being relatively small compared to the area of said pattern plate, said opening being centrally disposed in said head, said opening being disposed to project sand in a downward direction into said flask, means to move said flask toward said head to lift said flanges off of said wheels and to bring said flask into sealing engagement with said head, and means to blow sand through said opening into said flask, the portion of said head defining said opening being disposed adjacent the top level of said flask.

11. A molding machine comprising a head having a downwardly opening recess therein, a separate downwardly extending blow passage through said head, a flask support below said head adapted to support a flask and pattern plate thereon; flexible diaphragm means mounted on said head adapted to close such downwardly opening recess to retain fluid therebehind, power means operative to move such flask toward said head into sand sealing engagement therewith, the lower end of said passage defining an opening disposed adjacent the top level of such flask when such flask has thus been brought into such sand sealing engagement, means operative to blow sand through such opening into such flask, and means operative to move such pattern plate and flexible diaphragm means vertically relative to each other after such sand is in such flask whereby such sand will be compressed between said flexible diaphragm means and such pattern plate.

12. A molding machine comprising a head, said head having a cavity therein, an opening in said head spaced from such cavity, a flexible diaphragm arranged and disposed to close such cavity, a flask support below said head, a pattern plate and flask on said flask support, means to carry said flask under such cavity and opening and out from under such cavity and opening in said head, such opening in said head being relatively small compared to the area of said pattern plate and such opening being generally centrally disposed in said head to project sand in a downward direction into said flask, means to move said flask toward said head to bring said flask into sand sealing engagement with said head, means to blow sand through such opening into said flask, and means to supply such cavity with fluid under pressure to press said diaphragm into molding engagement with the sand in said flask, the portion of said head defining such opening being disposed adjacent the top level of said flask while sand is blown therewithin.

13. In a mold blowing machine having a sand reservoir with an opening for charging with sand, means for closing such opening, means operative to admit high pressure air to said reservoir, means operative to relieve the pressure in said reservoir, a centrally disposed blow hole in a head through which sand is discharged from said reservoir by such high pressure air, said reservoir having a funnel bottom terminating in such blow hole, and clamp means operative to hold a flask or the like firmly in position beneath said head to receive sand discharged through such blow hole; fluid pressure diaphragm means in said head laterally adjacent such blow hole operative to squeeze the sand in such flask on relative vertical movement of said diaphragm and flask after such blowing operation and prior to unclamping such flask.

14. A molding machine comprising an upstanding frame, a squeeze head at the top of said frame, said squeeze head having a downwardly opening recess extending to the complete periphery thereof, a flask support below said head adapted to support a flask and pattern plate thereon with pattern means disposed on such pattern plate leaving unobstructed a peripheral surface area of the latter adjacent the periphery of such flask, diaphragm means mounted on said head closing such downwardly opening recess to retain fluid therebehind within such recess, power means operative to move said flask support and thus such flask and pattern plate toward said head, means operative to fill such flask and pattern plate with sand through said head, and means operative to move such pattern plate and flexible diaphragm means vertically relative to each other after such sand is within such flask whereby such sand will be compressed between said flexible diaphragm means and such pattern plate principally only in a region laterally offset from such pattern adjacent the periphery of such flask where such sand is deepest.

(References on following page)

References Cited in the file of this patent

UNITED STATES PATENTS

| | | |
|---|---|---|
| 2,598,621 | Taccone | May 27, 1952 |
| 2,611,938 | Hansberg | Sept. 30, 1952 |
| 2,698,976 | Taccone | Jan. 11, 1955 |
| 2,757,424 | Daniel et al. | Aug. 7, 1956 |
| 2,790,215 | Herbruggen | Apr. 30, 1957 |
| 2,791,013 | Demmler | May 7, 1957 |

FOREIGN PATENTS

| | | |
|---|---|---|
| 824,543 | Germany | Dec. 13, 1951 |
| 834,428 | Germany | Mar. 20, 1952 |
| 538,283 | Canada | Mar. 19, 1957 |